United States Patent
Jang

(10) Patent No.: US 8,040,617 B2
(45) Date of Patent: Oct. 18, 2011

(54) REAL IMAGE DISPLAY DEVICE WITH WIDE VIEWING ANGLE

(75) Inventor: Sun-Joo Jang, Seoul (KR)

(73) Assignee: 3Dis Co., Ltd., Seoul (KR)

( * ) Notice: Subject to any disclaimer, the term of this patent is extended or adjusted under 35 U.S.C. 154(b) by 0 days.

(21) Appl. No.: 12/675,654

(22) PCT Filed: Aug. 29, 2008

(86) PCT No.: PCT/KR2008/005096
§ 371 (c)(1),
(2), (4) Date: Feb. 26, 2010

(87) PCT Pub. No.: WO2009/028908
PCT Pub. Date: Mar. 5, 2009

(65) Prior Publication Data
US 2010/0254001 A1 Oct. 7, 2010

(30) Foreign Application Priority Data

Aug. 31, 2007 (KR) .................. 10-2007-0088632

(51) Int. Cl.
*G02B 3/08* (2006.01)
*G02B 27/22* (2006.01)
(52) U.S. Cl. ........ 359/743; 359/463; 359/621; 359/622; 353/7
(58) Field of Classification Search .......... 359/462, 359/463, 619, 621, 622, 742, 743; 353/7, 353/28, 122
See application file for complete search history.

(56) References Cited

U.S. PATENT DOCUMENTS

| | | | | |
|---|---|---|---|---|
| 4,293,196 A | * | 10/1981 | Hilbert | 359/743 |
| 4,671,625 A | * | 6/1987 | Noble | 359/726 |
| 5,537,171 A | * | 7/1996 | Ogino et al. | 353/122 |
| 6,765,545 B2 | | 7/2004 | Son et al. | |
| 2006/0126180 A1 | | 6/2006 | Jung et al. | |

FOREIGN PATENT DOCUMENTS

JP 2002040365 2/2002

OTHER PUBLICATIONS

International Search Report dated Mar. 10, 2009 issued in PCT Patent Application No. PCT/KR2008/005096, 4 pages.
International Written Opinion dated Mar. 10, 2009 issued in PCT Patent Application No. PCT/KR2008/005096, 7 pages.
Korean Office Action dated Feb. 25, 2009 issued in Korean Patent Application No. 10-2007-0088632, 5 pages. English language summary provided.
Chinese Office Action dated Jun. 23, 2011 received in corresponding Chinese Patent Application No. 200880114648.4 with English language summary, 6 pgs.

* cited by examiner

*Primary Examiner* — Darryl J Collins
(74) *Attorney, Agent, or Firm* — Grossman Tucker Perreault & Pfleger, PLLC

(57) ABSTRACT

A 3-dimensional image display device having wide viewing angles using Fresnel lenses is disclosed. According to an embodiment of the invention, the 3-dimensional image display device includes an image source providing part for providing an image source, a first Fresnel lens refracting and transmitting the image source that is incident from the image source providing part, and a second Fresnel lens for generating a 3-dimensional image by refracting and transmitting the image source transmitted from the first Fresnel lens. At least one of the first Fresnel lens and the second Fresnel lens is a curved type Fresnel lens surface. The present invention can maximize the display area for a 3-dimensional image and realize the 3-dimensional image having wide viewing angles without distortion on the left and right boundaries.

15 Claims, 19 Drawing Sheets

REAL IMAGE DISPLAY DEVICE WITH WIDE VIEWING ANGLE

TECHNICAL FIELD

The present invention is related to an image display device, more specifically to a real-like image display device having wide viewing angles by using a Fresnel lens.

BACKGROUND ART

Generally, 3-dimensional image display refers to a technology of adding depth information to a two-dimensional image and using this depth information to allow the viewer to feel a sense of 3-dimensional vividness and reality. The 3-dimensional image display technologies are applied in various sectors, particularly in education, health, military, special purpose sectors, etc. Several types, in a variety of forms and methods, according to such technologies have been proposed for typical 3-dimensional image display devices in prior art. Until now, most of these technologies display 3-dimensional images using the principle of binocular disparity of a human being. As there are slight deviations between images presented to the left eye and to the right eye, perception of the disparity by the left and right eyes creates a sense of 3-dimensionality, so that a sense of protrusion may be obtained.

A typical form of prior art is to separate the left and right images, mainly with or without using eyeglasses. Glasses are used in the anaglyph type, polarized glasses type, and liquid crystal shutter type, while glasses are not used in the lenticular sheet type, parallax barrier type, and optical plate type.

Among these conventional technologies, the polarized glasses type is the oldest and most stable 3D display type, and is most widely used in 3D movies and 3D monitors, etc. The biggest drawback of this method, however, lies in the requirement of using special polarized glasses for 3-dimensional images. Thus, it increases eyestrains while wearing special polarized glasses.

The lenticular sheet type and parallax barrier type, among the types not using eyeglasses in prior art, provide low brightness and low resolution images and entail a fixed viewing position for a viewer, causing headaches or dizziness when viewing for an extended period of time.

There are also complete 3-dimensional types, including the holographic and volumetric 3D display types. While these types can produce 3-dimensional images freely in a space, they require expensive laser and precision optical components to display even a still image, and cannot provide real-time 3-dimensional images.

Proposed to solve these problems are some non-glasses types, which utilize reflectors, conventional optical lenses, and concave mirrors, etc., to enable real-time 3-dimensional images at lower costs. However, most of these methods experience distortion of images due to the concave mirrors, etc., and high costs of manufacturing when large devices are used. In particular, when large devices are used in order to obtain 3-dimensional images of a large display, there is a need to form a very large width of space, hindering the utility and applicability of these types.

In addition to these methods using concave minors and reflectors, methods using Fresnel lenses have been proposed in various types for a long time. It has been disclosed that two Fresnel lenses can be used to result in a 3-dimensional image effect, and that one or more Fresnel lenses and reflectors, etc., can be used to create 3-dimensional images in a 3-dimensional image effect. The drawback to these technologies, however, is that the ratio of display to a usable portion is low due to the rendition of object content at a time. In order to obtain 3-dimensional images of a large display, there is a need to form two or more of large transmissive type reflectors and image sources for a large display. Thus, high costs of manufacturing are inevitable when a very large width of space is formed.

In particular, 3-dimensional images, having wide viewing angles enlarged by a liquid crystal projector in which two Fresnel lenses are used to create 3-dimensional images of a large display, can be obtained. The 3-dimensional images generated here may not have distortion of images in viewing angles within the range of 10 to 20 degrees from the center, but may have serious distortion of images in viewing angles beyond the range. Namely, the problem is that distortion of images, in which the 3-dimensional images having an equal sense of depth at the center of a screen become smaller towards the reverse side of the screen on the left and right of the critical angle, can occur.

The problem of embodying 3-dimensional images according to prior art is that 3-dimensional images may not be completely viewed due to the serious distortion of images at the remaining portions except the portion of 10 to 20 degree from the center of the screen. Also, various applications for rendering 3-dimensional images for a large display can be limited due to various problems so that efficient rendering of 3-dimensional images can be difficult. Technologies for creating 3-dimensional images using three Fresnel lenses can be also limited in rendition and applications due to the distortion of images at the remaining portions except the center. The technology using a Fresnel lens and a reflector has merits that are the same as using two Fresnel lenses. In order to obtain 3-dimensional images of a large display, when large devices are used, relatively very large widths of space in the upper and lower sides and the front and rear sides are needed in proportion to the size of the display for 3-dimensional image, and the projection distance of 3-dimensional images becomes shorter by a reflector so that the sense of depth is reduced.

Referring to FIG. 1, a principle for and problems of creating 3-dimensional images using two flat Fresnel lenses in accordance with prior art are described below.

FIG. 1 illustrates a method of rendering 3-dimensional images based on prior art. A flat Fresnel lens has a constant focal length f and is comprised of a first Fresnel lens 115, upon which an input image source is incident, and a second Fresnel lens 120 for projecting 3-dimensional images. The 3-dimensional images, having a different sense of depth in forms of expansion and reduction for the input image source corresponding to a distance d1 from the center of an image source supply part 110 to the first Fresnel lens 115 and a distance d2 from the first Fresnel lens 115 to the second Fresnel lens 120, can be generated at a location separated by d3 from the second Fresnel lens 120.

As shown in FIG. 1, the 3-dimensional images can be generated in the air over a location d3 according to a certain location d1 from the image source supply part 110 by combining the first Fresnel lens 115 and the second Fresnel lens 120, and the 3-dimensional images can be observed by a viewer from a certain area θ1. Here, the distance d2 from the first Fresnel lens 115 to the second Fresnel lens 120 maintains a range in which there is no distortion or aberration of images.

When two Fresnel lenses 115 and 120, with a focal length f1 of the first Fresnel lenses 115 and a focal length f2 of the second Fresnel lenses 120, are arranged in a row within a certain distance, the two Fresnel lenses 115 and 120 can form a focal length f3 127. Here, f3 is a focal length formed by the two Fresnel lenses. Here, when projecting a 2-dimensional image source using two Fresnel lenses 115 and 120, an output image focal plane 125, on which an image is formed, can be formed in a spherical shape inwards from a focal length 127 of the two Fresnel lenses 115 and 120. Meanwhile, when observed from the perspective of the viewer, the output portion of the 3-dimensional images recognized by human eyes can be within the range of viewing angles θ1 having a certain aperture and passing the focal length 127 formed by arranging the two Fresnel lenses 115 and 120. Within this range, the viewer can recognize the same image as the one formed on the output image focal plane 125. Here, the generated 3-dimensional image seem as if it is floating in space. The principle will be described in more detail below. A 2-dimensional image projected from the image source supply part 110 of FIG. 1 can be projected towards the first Fresnel lens 115. The first Fresnel lens 115 and the second Fresnel lens 120 work in combination like a single lens. The output image focal plane 125 is located within the range of the focal length 127 of the two Fresnel lenses 115 and 120. Referring to FIG. 1, the desired 3-dimensional images can be obtained on the output image focal plane 125 only if an image on the screen projected from the image source supply part 110 and the first Fresnel lens 115 maintains a certain distance d1. Also, the 3-dimensional images, formed by the structure of double Fresnel lenses, can form the output image focal plane 125 that has different forms according to the way the directions of grooves of the first Fresnel lens 115 and the second Fresnel lens 120 are arranged. This is because a ray of light refracts to different refracting angles according to the difference of incident angles from the groove plane of the Fresnel lens. The problem is that the output image focal plane 125 formed in a spherical shape is formed on only about ¼ of the center portion against the total display area of the second Fresnel lens 120, and that distortion of image occurs while a 3-dimensional image becomes smaller from the center of the output image focal plane 125 to the edges. The spherical shape output image focal plane 125, which is formed in case the grooves of the Fresnel lenses 115 and 120 face each other, can be formed on a screen 210 (in FIG. 2) of the 3-dimensional image source having a circular boundary plane 225 (in FIG. 2). Accordingly, in comparison with the total size of the screen 210 (in FIG. 2), the display area of the generated 3-dimensional image can be rendered within the circular boundary plane 225 at the center, and in comparison with the total size of the screen 210 as a background against the 3-dimensional image, the display area can be only a smaller portion, so that a sense of depth can be reduced on the whole when creating the 3-dimensional image. Moreover, when observed from a distance to the left and right of the screen, distortion of image occurs due to a spherical surface of the 3-dimensional image.

FIG. 2 illustrates the form of a 3-dimensional image source and viewing angles according to prior art.

Referring to FIG. 2, when crating a 3-dimensional image using the flat Fresnel lens, a globe-shaped boundary surface 225 can be formed on a screen. Here, the viewer can only observe the 3-dimensional image in the globe-shaped boundary surface 225.

In FIG. 2, a viewer 240a at the center portion among viewers 240a, 240b and 240c can sense a 3-dimensional image 230a with a certain degree of depth. However, the viewers 240b and 240c see images 230b and 230c that are distorted and appear to be smaller than the image 230a viewed by the viewer 240a, and the images 230b and 230c appear to be curved into the screen 210 due to the reduced sense of depth. Therefore, the 3-dimensional images can be distorted according to the viewers' positions. Also, due to narrow viewing angles, images cannot be observed by multiple viewers at the same time and can be viewed only within certain portions.

As shown in FIG. 2, according to the positions of the viewers 240a, 240b and 240c, the 3-dimensional effect of 3-dimensional images can be varied. From the center portion, the left and right image display areas, i.e. viewing angles, can be very narrow, so that the center portion of the entire screen 210 can be only used when rendering the 3-dimensional images. So, due to the limits of the viewing angles and the display area of the 3-dimensional images in prior art, this method may not be applicable in various sectors. In this way, the output image focal plane 125 formed in a spherical shape in accordance with prior art has narrow viewing angles while the distortion of images becomes intensified from the center of the image source to the edges according to a 2-dimensional plane image of the input image source rendered in a spherical shape. When embodying the methods of prior art, the rendition of images can be limited due to the limited use of ¼ of the center portion against the total screen area when rendering the 3-dimensional images, and the distortion of image becomes intensified at the boundary plane on which the 3-dimensional images are rendered, so that the narrow viewing angles are inevitable when using the methods.

DISCLOSURE

Technical Problem

The present invention provides a 3-dimensional image display device having wide viewing angles that can maximize a display area of a 3-dimensional image and embody a 3-dimensional image having wide viewing angles with undistorted images on the left and right boundary planes.

Technical Solution

According to an aspect of the present invention, a 3-dimensional image display device having wide viewing angles by using the double bond structure of a first Fresnel lens and a second Fresnel lens is disclosed.

According to an embodiment of the present invention, a 3-dimensional image display device having wide viewing angles, in which at least one of a first Fresnel lens and a second Fresnel lens is to be a curved Fresnel lens, is disclosed. The 3-dimensional image display device may include: an image source for supplying an image; the first Fresnel lens for refracting and transmitting the image from the image source; and the second Fresnel lens for forming a 3-dimensional image by refracting and transmitting the image transmitted through the first Fresnel lens.

The first Fresnel lens can be a curved Fresnel lens, and the second Fresnel lens can be a flat Fresnel lens.

Here, the focal length of the first Fresnel lens can be longer than or equal to the focal length of the second Fresnel lens.

Here, the focal length of the first Fresnel lens can be shorter than the focal length of the second Fresnel lens.

According to an embodiment of the present invention, a 3-dimensional image display device having wide viewing angles, in which the first Fresnel lens and the third Fresnel lens are flat Fresnel lenses bending in the opposite direction, and a groove of the first Fresnel lens is configured to form in a direction of facing the image source, and a groove of the third Fresnel lens is configured to form in a direction of facing the second Fresnel lens, and the second Fresnel lens is a flat Fresnel lens, is disclosed. The 3-dimensional image display device may further include: a third Fresnel lens that interposed between the first Fresnel lens and the second Fresnel lens for refracting and transmitting the image transmitted through the first Fresnel lens.

Here, According to an embodiment of the present invention, a 3-dimensional image display device having wide viewing angles, in which the first Fresnel lens and the third Fresnel lens are configured to be flat Fresnel lenses, and the groove of the first Fresnel lens and the groove of the third Fresnel lens are configured to form in a direction of facing each other or in the opposite direction, and the second Fresnel lens is configured to be a curved Fresnel lens, may further include: the third Fresnel lens interposed between the first Fresnel lens and the second Fresnel lens and configured to refract and transmit the image transmitting through the first Fresnel lens.

Any one of anti-glare, an AR polarized film, and a surface antireflection mask is coated over the surface of the first Fresnel lens or the second Fresnel lens.

The image source may include: a main image source configured to provide a main image; and a background image source configured to provide a background image as the background of the main image.

The image source may include: a translucent mirror configured to reflect the image source and transmit the image source.

The image source may be a display or a real product of among CRT, LCD, PDP, LED, OLED, DLP projectors and flexible displays.

According to another embodiment of the present invention, a 3-dimensional image display device having wide viewing angles may include: an image source configured to provide an image; and a Fresnel lens configured to have a curved type Fresnel lens surface, the curved type Fresnel lens surface reflecting and transmitting the ray of light incident, and a flat type Fresnel lens surface having a shorter focal distance than the curved type Fresnel lens surface formed on both sides respectively.

Any one of anti-glare, an AR polarized film and a surface antireflection mask is coated over the surface of the flat type Fresnel lens surface.

According to another aspect of the present invention, a Fresnel lens having grooves formed on both sides thereof is disclosed.

According to an embodiment of the present invention, a Fresnel lens having grooves formed on both sides thereof may include: a curved type Fresnel lens surface configured to reflect and transmit a ray of light incident; and a flat type Fresnel lens surface configured to reflect and transmit the ray of light incident transmitted through the curved type Fresnel lens surface and configured to have a shorter focal distance than the curved type Fresnel lens surface.

MODE FOR INVENTION

Figure 1:
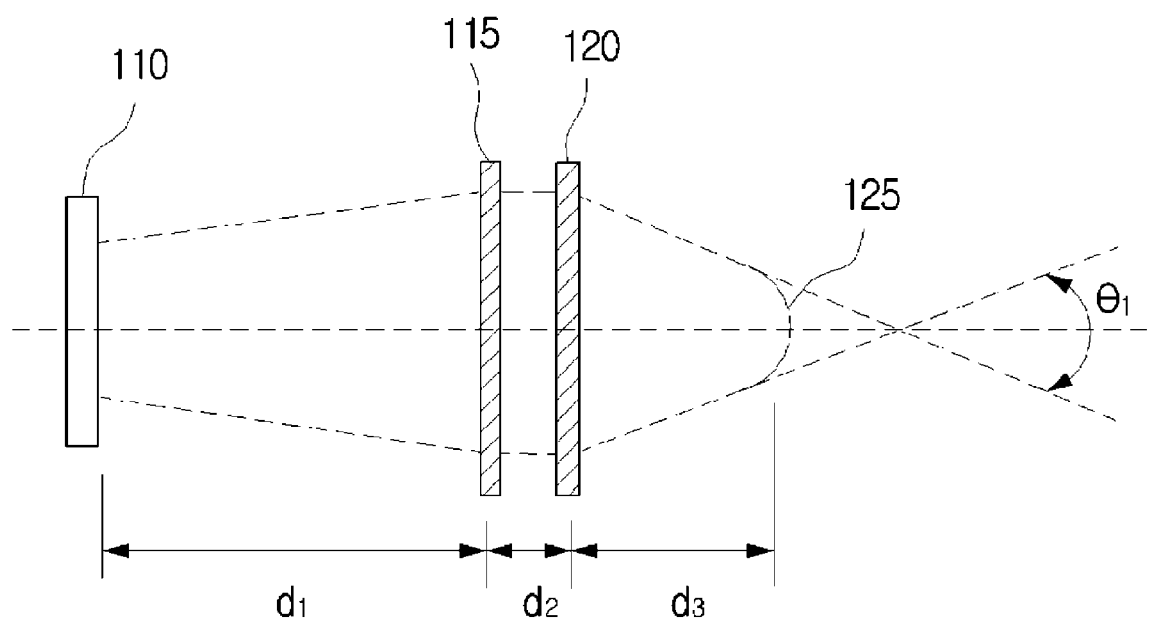
FIG. 1 is a cross sectional view illustrating a 3-dimensional image device according to prior art.
Figure 2:
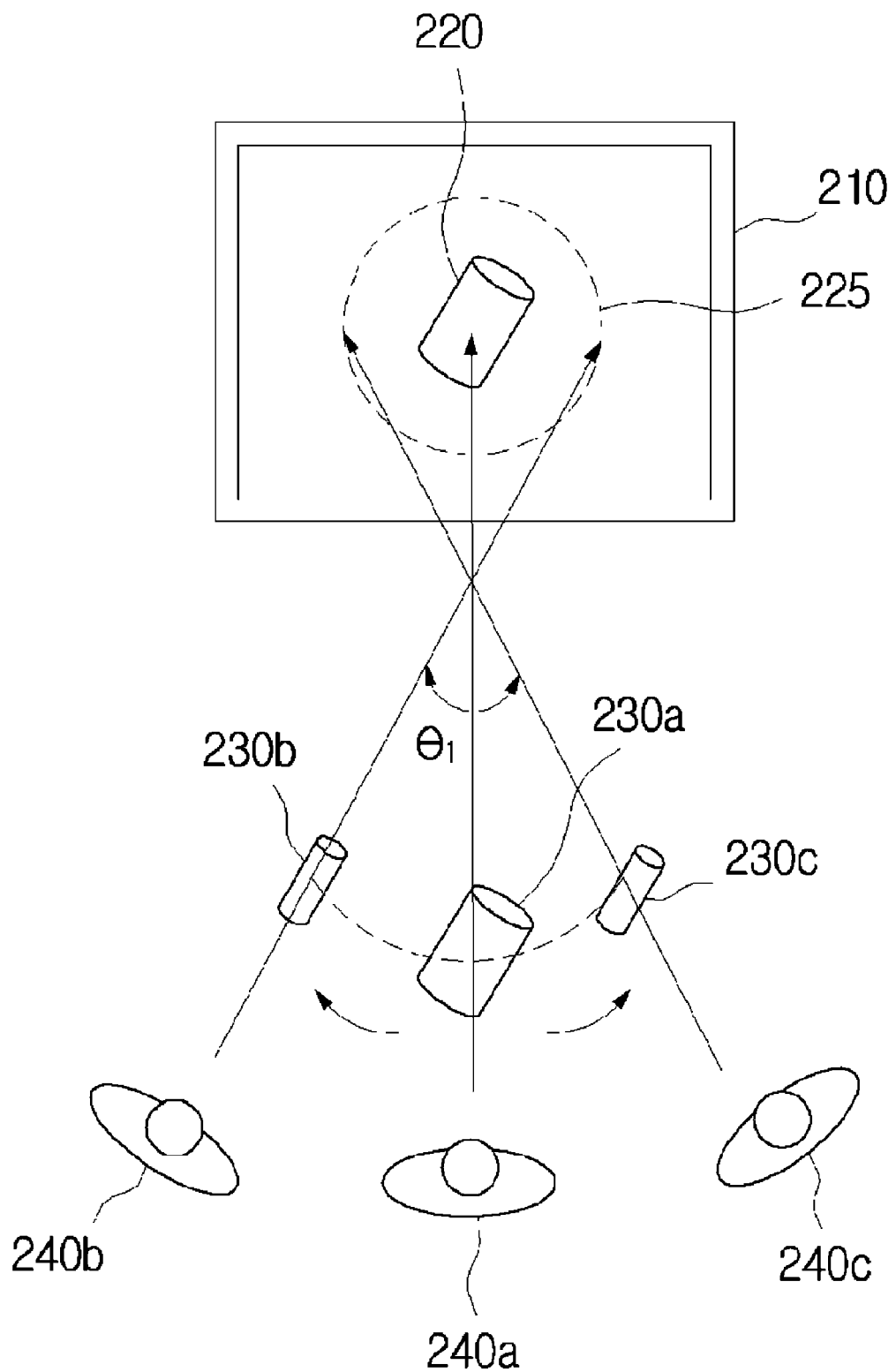
FIG. 2 is a drawing illustrating the form of a 3-dimensional image source and viewing angles according to prior art.

As the invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention. Terms such as "first" and "second" can be used in describing various elements, but the above elements shall not be restricted to the above terms. The above terms are used only to distinguish one element from the other. For instance, the first element can be named the second element, and vice versa, without departing the scope of claims of the present invention. The term "and/or" shall include the combination of a plurality of listed items or any of the plurality of listed items. When a component is mentioned to be "connected to" or "accessing" another component, this may mean that it is directly formed on or stacked on the other component, but it is to be understood that another component may exist in-between. On the other hand, when a component is mentioned to be "directly connected to" or "directly accessing" another component, it is to be understood that there are no other components in-between.

The terms used in the present specification are merely used to describe particular embodiments, and are not intended to limit the present invention. An expression used in the singular encompasses the expression of the plural, unless it has a clearly different meaning in the context. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Unless otherwise defined, all terms, including technical terms and scientific terms, used herein have the same meaning as how they are generally understood by those of ordinary skill in the art to which the invention pertains. Any term that is defined in a general dictionary shall be construed to have the same meaning in the context of the relevant art, and, unless otherwise defined explicitly, shall not be interpreted to have an idealistic or excessively formalistic meaning.

Certain embodiments of the present invention will be described below in detail with reference to the accompanying drawings. For better understanding overall in describing aspects of the present invention, the same reference numerals are used for the same means, regardless of the figure number. Those components that are the same or are in correspondence are rendered the same reference numeral regardless of the figure number, and redundant explanations are omitted.

Figure 3:
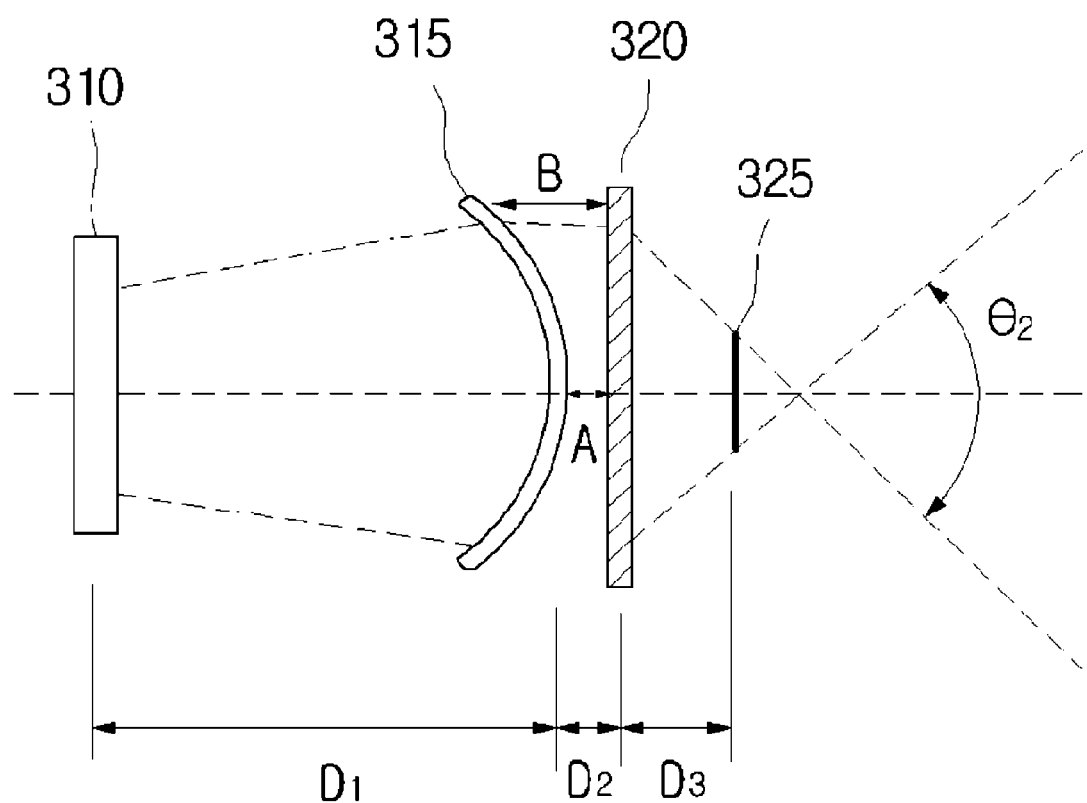
FIG. 3 is a cross sectional view illustrating a 3-dimensional image device having wide viewing angles according to an embodiment of the present invention.

FIG. 3 is a cross sectional view illustrating a real-like image device having wide viewing angles in accordance with an embodiment of the present invention.

A 3-dimensional image display device in accordance with an embodiment of the present invention can include: an image source providing part 310 for providing a image source; a curved Fresnel lens 315 for extending viewing angles and producing an undistorted 3-dimensional image from a image source projected from the image source providing part 310; a flat Fresnel lens 320 for forming a 3-dimensional image at a focal plane by refracting and condensing the image refracted and extended from the curved Fresnel lens 315.

An image source 310, for example, can be a display such as CRT, LCD, PDP, LED, OLED, DLP projectors and flexible displays. In another embodiment of the invention, the image source 310 may be a real product. Namely, if a 3-dimensional image is generated by using Fresnel lenses which are disclosed in the present embodiment of the invention, the display or the real product can be an image source 310.

Here, a curved Fresnel lens can have a certain pattern of curvature. The curved Fresnel lens can be produced by pressing equal forces against a flat Fresnel lens to have a radius of curvature R. By using such a method, massive production can be possible at lower costs, and the manufacturing of a special form of a flat Fresnel lens having the properties of the curved Fresnel lens can be implemented.

In addition to the above, anti-glare, an AR polarized film and a surface antireflection mask coated over the surfaces of the curved Fresnel lens 315 or the flat type Fresnel lens 320 can reduce the internal reflection of light, the dispersion of light when refracting, and etc. A structure and combination of these substances are generally understood by those with ordinary knowledge in the field of art to which the present invention belongs, so that certain detailed explanations of prior art are omitted. The substances above can be also stacked over the surfaces of lenses described below.

A lens part comprises the curved Fresnel lens 315 and the flat Fresnel lens 320. When $f_F$ is a focal length of the flat Fresnel lens and $f_C$ is a focal length of the curved Fresnel lens, a focal length of the lens part can be equal to the sum of the focal length $f_F$ of the flat Fresnel lens and the focal length $f_C$ of the curved Fresnel lens. The curved Fresnel lens 315 is incident an input image from the image source, and the flat Fresnel lens 320 projects the input image. In correspondence with the distance D1 from the input image to the curved Fresnel lens and the distance D2 from the curved Fresnel lens to the flat Fresnel lens, wide viewing angles of 3-dimensional images can be formed as well as the 3-dimensional images of a large display with less distortion of image. This will be described in more detail in the description below. The Fresnel lenses are thin, flat Fresnel lenses, formed by providing a certain pattern of curvature on the surface such that they have identical optical properties with regular concave lenses or convex lenses, and a Fresnel lens has a single F number. There are two forms of Fresnel lenses: the positive relief Fresnel lens, functioning as a collector, which refracts parallel incident light to converge to the focal point of the Fresnel lens, or as a collimator, which refracts incident light to the opposite direction to have a parallel path, and the negative relief Fresnel lens, functioning as a diverger, which disperses parallel incident light. The flat Fresnel lenses are mainly used in projection televisions and overhead projectors. The Fresnel lenses of such type may be substituted by positive relief Fresnel lenses, and depending on the arrangement with respect to the directions of the grooves of the Fresnel lenses, by negative relief Fresnel lenses.

Referring to FIG. 3, a flat Fresnel lens 320 and a curved Fresnel lens 315 form double Fresnel lenses.

The flat Fresnel lens 320 and curved Fresnel lens 315 are all disposed at the same center axis. The focal length $f_C$ of the curved Fresnel lens 315 among the Fresnel lenses of the double Fresnel lens structure can be greater than the focal length $f_F$ of the flat Fresnel lens 320 (that is, $f_C \geq f_F$). Because the curved Fresnel lens 315 has a curvature, and the different distances A and B at its center and the edge occur respectively when deformed, the curved Fresnel lens 315 can be formed by using the flat Fresnel lens having a long focal length in order to create 3-dimensional images having the same sense of depth. Here, the focal length of the curved Fresnel lens 315 can be greater or smaller than, or equal to the focal length of the flat Fresnel lens 320. Namely, the focal length of the curved Fresnel lens 315 can determine a distance D3 from the flat Fresnel lens 320 to the output image focal plane 325, and increase a sence of 3-dimensional image.

Therefore, wide viewing angles can be formed, and a display area of 3-dimensional images can be expanded by the curved Fresnel lens 315 having a focal length greater than or equal to the flat Fresnel lens 320. In addition, when arranging the double Fresnel lenses in accordance with a combination of the flat Fresnel lens 320 and the curved Fresnel lens 315, an effective 3-dimensional image can be rendered by controlling the distance D1 between the image source 310 and the curved Fresnel lens 315 or the distance D2 between the curved Fresnel lens 315 and the flat Fresnel lens 320, and by controlling a size of desirable 3-dimensional image and a sense of depth. Namely, if the focal length of the double Fresnel lens is F, when the distance D1 between the image source 310 and the curved Fresnel lens 315 satisfies 2F<D1<1F, a 3-dimensional image bigger than the input image can be formed. If D1=2F, a 3-dimensional image having the same size as the input image can be formed, and if D1>2F, a 3-dimensional image smaller than the input image can be formed. Illustrated in FIG. 3 are distances A and B, which are respectively measured from the center and the edges between the curved Fresnel lens 315 and the flat Fresnel lens 320. The size and spatial position of the 3-dimensional images being observed from the perspective of a viewer at the center can be determined by the distance D3, a generating distance of the 3-dimensional images, in which D3 is formed by adding the distance D1 from the image source 310 to the curved Fresnel lens 315 and the distance D2 from the curved Fresnel lens 315 to the flat Fresnel lens 320 along its optical axis, when the distance at its center is A as illustrated in FIG. 3.

On the other hand, when the viewer's viewing position is moved from its current center position, the distance between the image source 310 and the curved Fresnel lens 315 may become smaller in accordance with the curved Fresnel lens 315 having a certain radius of curvature R. Meanwhile, the distance between the curved Fresnel lens 315 and the flat Fresnel lens 320 may increase, and an input image being incident from the image source can be expanded and refracted through the curved Fresnel lens 315 and then projected into the flat Fresnel lens 320.

Figure 4:
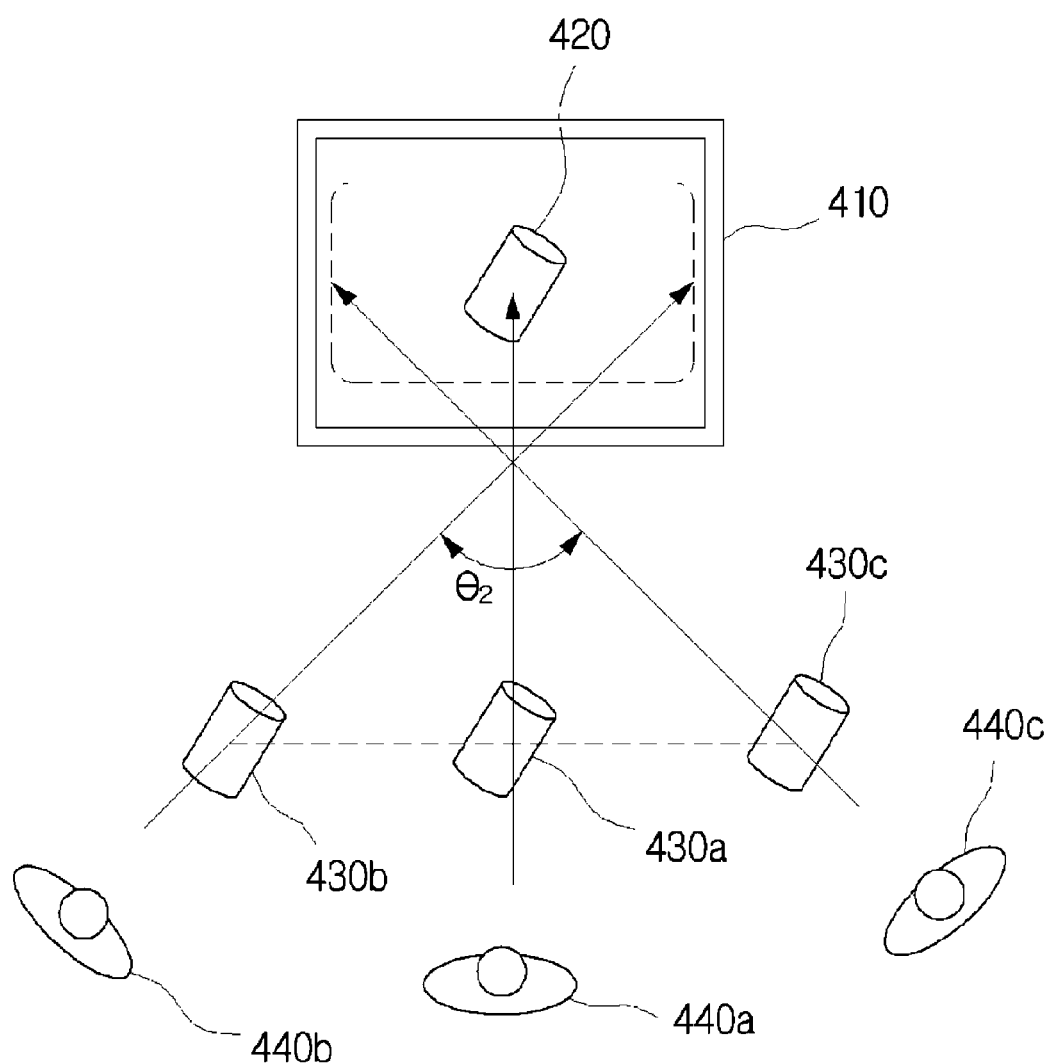
FIG. 4 is a drawing illustrating an image and a denotable form of 3-dimensional image that is visible from viewer's position realized by the device of FIG. 3.

Therefore, the viewing angles of a 3-dimensional image can be more widely expanded with no distortion on the left and right boundaries by the curved Fresnel lens 315. That is, the input image can be expanded and refracted by the curved Fresnel lens 315 while increasing a distance between the two lenses, and then projected into the flat Fresnel lens 320. By such a method, as illustrated in FIG. 4, the size of a 3-dimensional image and its sense of depth being generated by the input image from its center can be equal to those on the boundary plane within the range of viewing angles θ2, and thus a 3-dimensional image without distortion on the boundary plane can be presented.

In the curved Fresnel lens 315 having a certain radius of curvature R, angles of grooves of incident boundary surfaces on the left and right boundary plane can be decreased by way of the curved surface structure, so that light towards the flat Fresnel lens 320 can have smaller refracting angles and be projected. As a result, by way of forming the curved surface shape using the curved Fresnel lens 315, the range of refraction can be extended due to the angle changes of the incident boundary surfaces at the left and right boundary plane rather than the center, so that the display area can be formed for a greater range of the input image.

The input image can be displayed on the output image focal plane 325 within a certain focal length of the double structure of the curved Fresnel lens 315 and the flat Fresnel lens 320 through refracting and transmitting. The displayed 3-dimensional image can be observed from a range of 90~100 degrees without distortion and can have a same sense of depth at the uppermost angle of the left and right. Thus, in accordance with the present embodiment of the invention, a 3-dimensional image having wide viewing angles for a large display can be produced.

According to the present embodiment of the invention, a 3-dimensional image having a display area and wide viewing angles extended can be produced without distortion of images in comparison with prior art.

In this case, the distance difference A between the centers of the Fresnel lenses can be constant within the range in which there is no distortion of a 3-dimensional image and no chromatic aberration when creating the 3-dimensional image, and the distance difference B between the boundary edges of the Fresnel lenses can be formed by a radius R of curvature of the curved Fresnel lens. In addition to the above, the real-like image display device can make up for the distortion of a 3-dimensional image at the boundary surface of the indicating potion and can extend the total screen area for rendering a 3-dimensional image used restrictively in prior art by way of a double bond structure of the curved Fresnel lens 315 and the flat Fresnel lens 320. This is because the R, G, B colors of the image can reduce the difference of projection distance between them on the 3-dimensional images on which the colors of the image are formed by being entered through the curved Fresnel lens, and the coma will be reduced by forming a flat type 3-dimensional image against a conventional hemisphere type 3-dimensional image.

Also, the double bond structure of the curved Fresnel lens 315 and the flat Fresnel lens 320 can reduce or remove chromatic aberration and distortion of images at the boundary surface of coma, which occur in the double bond structure of multiple flat Fresnel lenses in prior art. In accordance with prior art, in case of using a Fresnel, when looking at a 3-dimensional image as colors of R, G, B which have different wavelengths of light, chromatic aberration of a lens which is seen as fringes of color can be occurred because each of the colors R, G, B cannot be focused at a single common point in the focal plane due to a different refractive index of the Fresnel lens. Also, when a ray of light is obliquely projected along the optical axis, coma which refers to aberration inherent to certain optical designs or due to imperfection in the lens which results in off-axis point sources can be occurred. However, when using the double Fresnel lenses of the curved Fresnel lens 315 and the flat Fresnel lens 320, both chromatic aberration and coma can be minimized FIG. 4 is a drawing illustrating an image and a denotable form of 3-dimensional image that is visible from viewer's position realized by the device of FIG. 3. Portions for observing a 3-dimensional image at a screen 410 of a 3-dimensional image device can be 430a, 430b, 430c by means of composing the curved Fresnel lens 315 and the flat Fresnel lens 320. A wide 3-dimensional image without distortion can be rendered in the portions 430a, 430b, 430c.

A input image 430 can be extended and refracted towards a curved surface by a curved Fresnel lens 315. The extended and refracted image can be refracted again in a certain focal length 327 by a flat Fresnel lens 320. A 3-dimensional image observed by a viewer 440a can be formed by two flat Fresnel lenses in prior art. Also, the 3-dimensional image observed by viewers 440b, 440c can be extended with greater refracting degrees and transmitted into a broader portion by the curved Fresnel lens. The 3-dimensional image can be again projected towards the flat Fresnel lens 320, so that the viewer can observe the 3-dimensional image in wider range of viewing angles θ2. Also, the intervals between the curved Fresnel lens 315 and the flat Fresnel lens 320 can be different at the center and the edge. That is, the 3-dimensional image 420 can be extended due to the interval B increased in comparison with the interval A between the curved Fresnel lens and the flat Fresnel lens.

Therefore, the 3-dimensional image 430b, 430c observed by the viewers 440b, 440c can be the same as the 3-dimensional image 430a observed by the viewer 440a with a sense of depth and no distortion. In comparison with a circular shape display area 225 in prior art, the present invention provides a rectangular shape display area 445 for a large display, so that a 2-dimensional image without any processing can have a sense of depth. Here, the curved Fresnel lens 315 can be produced by pressing forces against a flat Fresnel lens to have a radius of curvature R, so that massive production is possible at lower costs. In accordance with the present embodiment of the invention, the present invention can be applied in a 3-dimensional image display device in which a 2-dimensional image source is extended as a large plane image in the air without distortion by using a 2-dimensional image source or a real product in prior art, and in a device for projecting a image with no distortion in a certain distance in the air. In particular, the space transmission effect having a sense of depth by projecting the 2-dimensional image in a certain distance in the air can be provided in the 3-dimensional image display device for a 3-dimensional image effect without glasses. More specifically, the 3-dimensional image display device without glasses are provided for viewing a 3-dimensional image having a equal sense of depth without distortion at the left and right of the critical angle, in which the 3-dimensional image can be observed from broader viewing angles and can be rendered in a wider indicating potion, by using the double Fresnel lenses structure in which a curved Fresnel lens and a flat Fresnel lens are arranged in a row to overcome problems of prior art.

Figure 5:
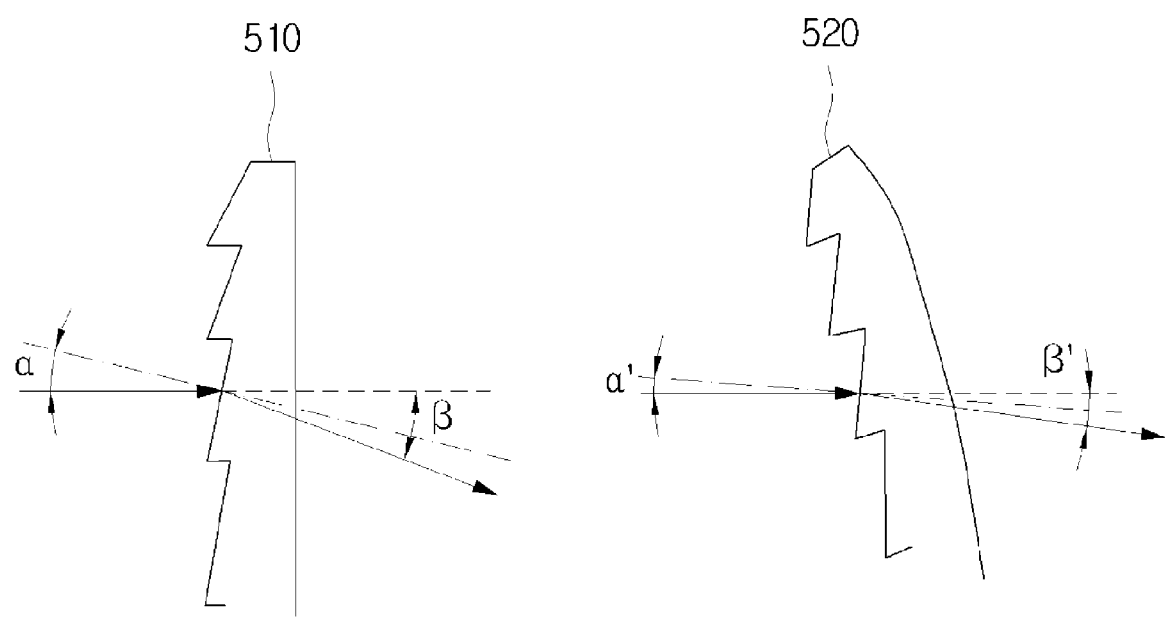
FIG. 5 is a drawing representing the refractivity of flat Fresnel lens and curved Fresnel lens comprised in a 3-dimensional image device having wide viewing angles according to an embodiment of the present invention.

FIG. 5 is a drawing representing the refractivity of flat Fresnel lens 510 and curved Fresnel lens 520. The surfaces of the flat Fresnel lens 510 can be obtained by the equation (1) that is for an aspheric lens as follows.

$$Z = \frac{CX^2}{1 + \sqrt{1 - (k+1)C^2X^2}} + \alpha X^4 + \beta X^6 + \gamma X^8 + \delta X^{10} \quad (1)$$

Here, Z is the surfaces of an aspheric lens, C the vertex curvature of a lens, and k a conic constant. If k=0, then it is circular, if k<−1, then it is hyperbolic, if −1<k<0, then it is oblate ellipse, and if k>0, then it is prolate ellipse. In addition, $\alpha$, $\beta$, $\gamma$, $\delta$ are aspheric values for determining the aspheric properties of a lens. In case of the flat Fresnel lens 510, as illustrated in FIG. 5, a single ray of light (solid line) transmitting through a point among light sources in correspondence with an input image can pass through the boundary surfaces of grooves formed on the flat Fresnel lens 510. Here, a ray of incident light strikes at an angle of a towards the groove surface along the vertical line (dotted line) and then transmits through the lens 510 at an angle of In case of the curved Fresnel lens 520, when the same ray of light being incident strikes a groove of the curved Fresnel lens 520 having a certain value of curverture, the ray enters the surface of the groove at an angle of $\alpha'$ since the lens 520 has different incident angles of grooves thereof. Consequently, $\alpha'$ is smaller than $\alpha$, and the ray of light transmits through the lens 520 at an angle of That means As such, a single ray of light transmitting through the same point can be refracted at an angle of smaller degrees in portions having the curvature of the curved Fresnel lens in comparison with the flat Fresnel lens. Thus, an image source transmitting through the curved Fresnel lens can be expended and refracted in a broader portion, so that viewing angles having wide degrees and indicating potion for a large display can be provided.

Figure 6:
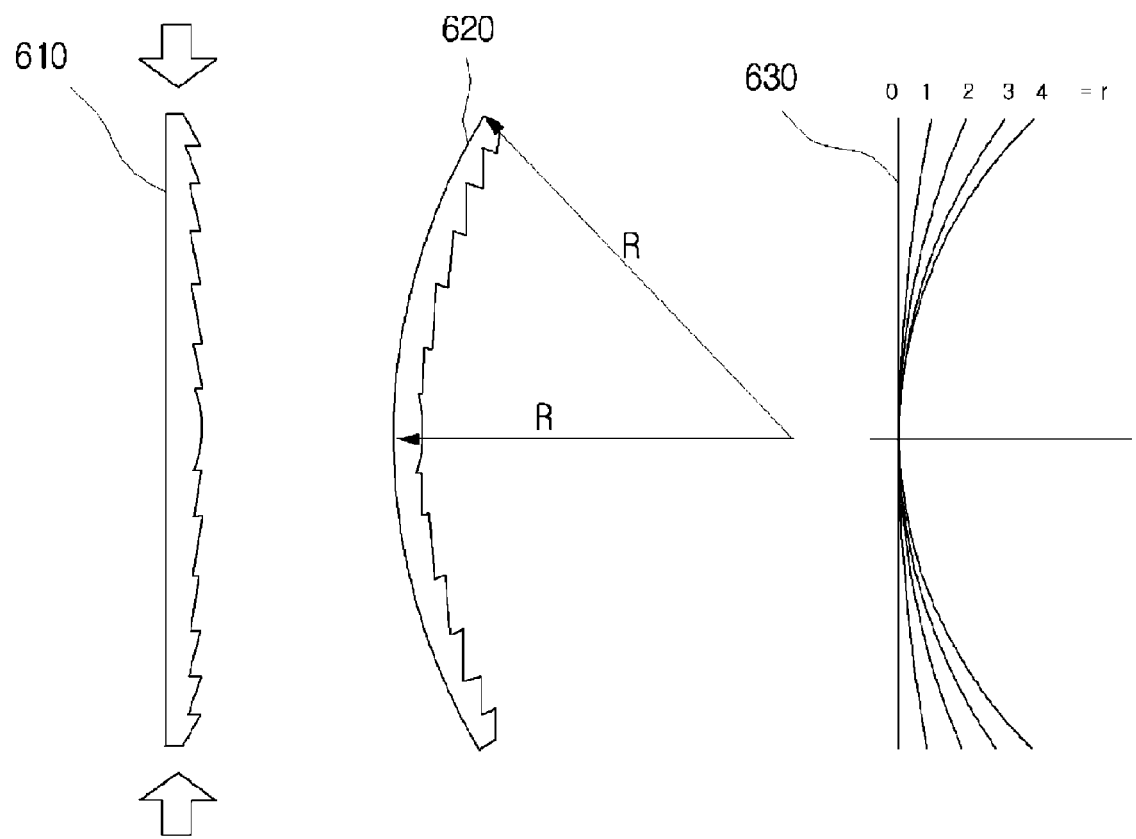
FIG. 6 is a drawing representing a method of forming a curved Fresnel lens and curvature according to an embodiment of the present invention.

FIG. 6 is a drawing representing a method of forming a curved Fresnel lens 620 and curvature according to an embodiment of the invention. According to methods of manufacturing a curved Fresnel lens 620, the curved Fresnel lens having a radius of curvature R can be produced by pressing equal forces against a flat Fresnel lens 610. Here, when rendering the curvature 630 of the Fresnel lens as r, the curved Fresnel lens 620 having a constant curvature can be produced in cases that r having a constant is expressed as 1 to 4 optionally. In accordance with the difference of curvature, the curved Fresnel lens used in the present invention can have different properties in refraction and transmission.

Although he method of manufacturing the curved Fresnel lens 620 from an ordinary flat Fresnel lens 610 is described here, the curved Fresnel lens 620 can be directly produced from an ordinary curved Fresnel lens without manufacturing from the ordinary flat Fresnel lens.

Figure 7:
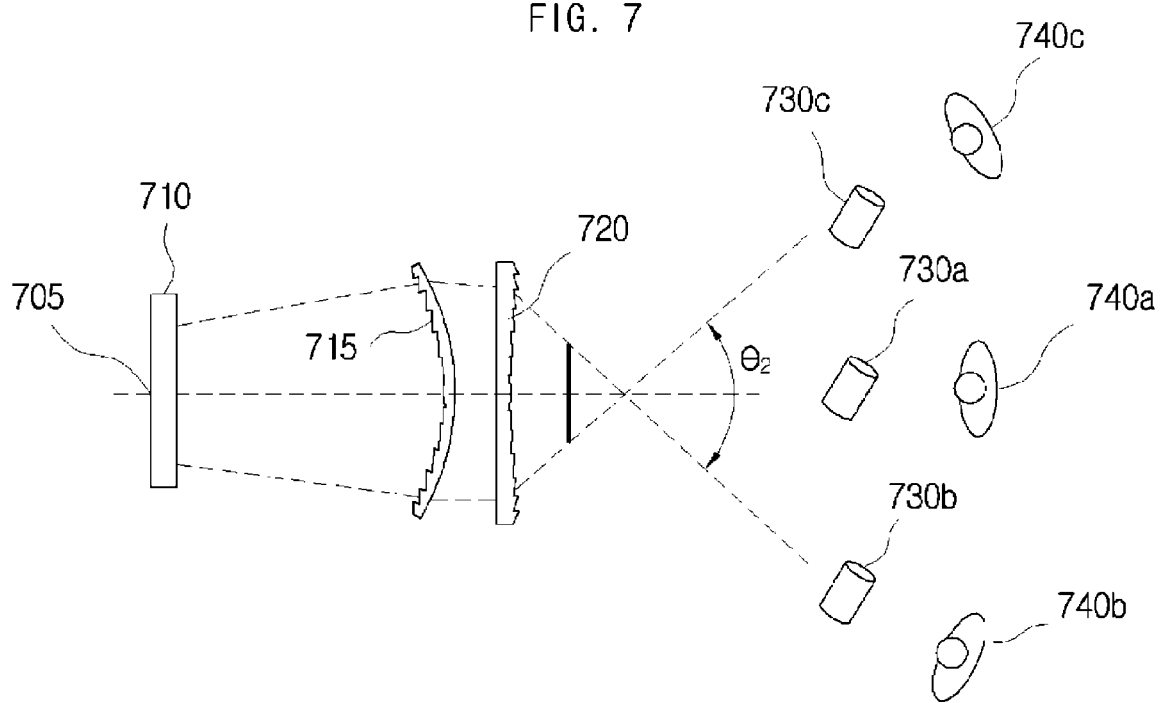
FIG. 7 is a cross sectional view illustrating a 3-dimensional image device having wide viewing angles according to an embodiment of the present invention.

FIG. 7 is a cross sectional view illustrating a 3-dimensional image device having wide viewing angles according to an embodiment of the invention. Hereinafter, the only difference may be explained.

Illustrated are an image source supply part 710 having the central axis 705 against a viewer 740a, a curved Fresnel lens 715 for providing the input image the depth of wide viewing angles, and a flat Fresnel lens 720 making the image that passed through the curved Fresnel lens 715 a 3-dimensional image. Here, the focal length f2 of one Fresnel lens used for constituting the curved Fresnel lens 715 can be equal to or greater than the focal length f1 of the flat Fresnel lens 720. The two lenses are arranged in a manner such that the surface of grooves of the curved Fresnel lens 715 faces the image source 710 while the surface of the grooves of the flat Fresnel lens 720 can face the observer. This arrangement is to expand the input image on the left and right boundaries while enlarging and refracting the input image in wider angles. In order to generate the input image to a 3-dimensional image without any image distortion, it is also possible to additionally arrange one or more Fresnel lenses, the type of construction permitting. Both the flat Fresnel lens 720 and the curved Fresnel lens 715 are disposed on its center axis.

Therefore, viewers 740a, 740b, 740c can observe 3-dimensional images 730a, 730b, 730c having an equal sense of depth from wide viewing angles greater than 90~100 degrees by the composition of the lenses.

Figure 8A:
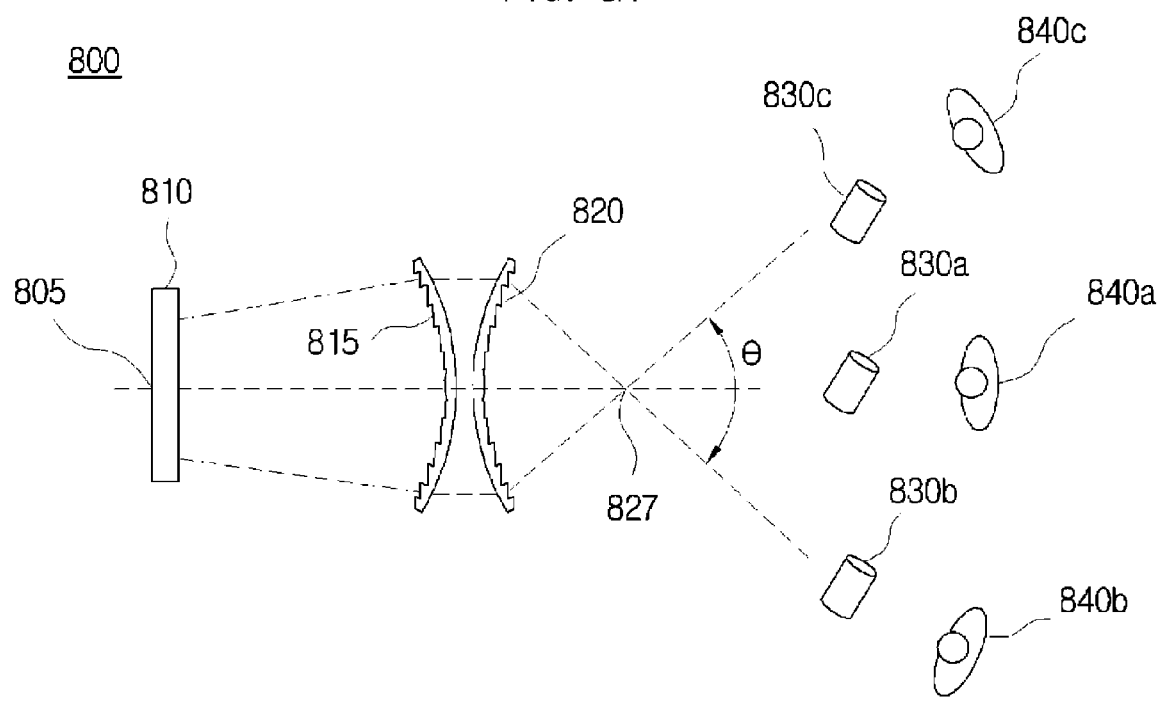
FIGS. 8A and 8B are a cross sectional view illustrating a 3-dimensional image device having wide viewing angles according to an embodiment of the present invention.
Figure 8B:
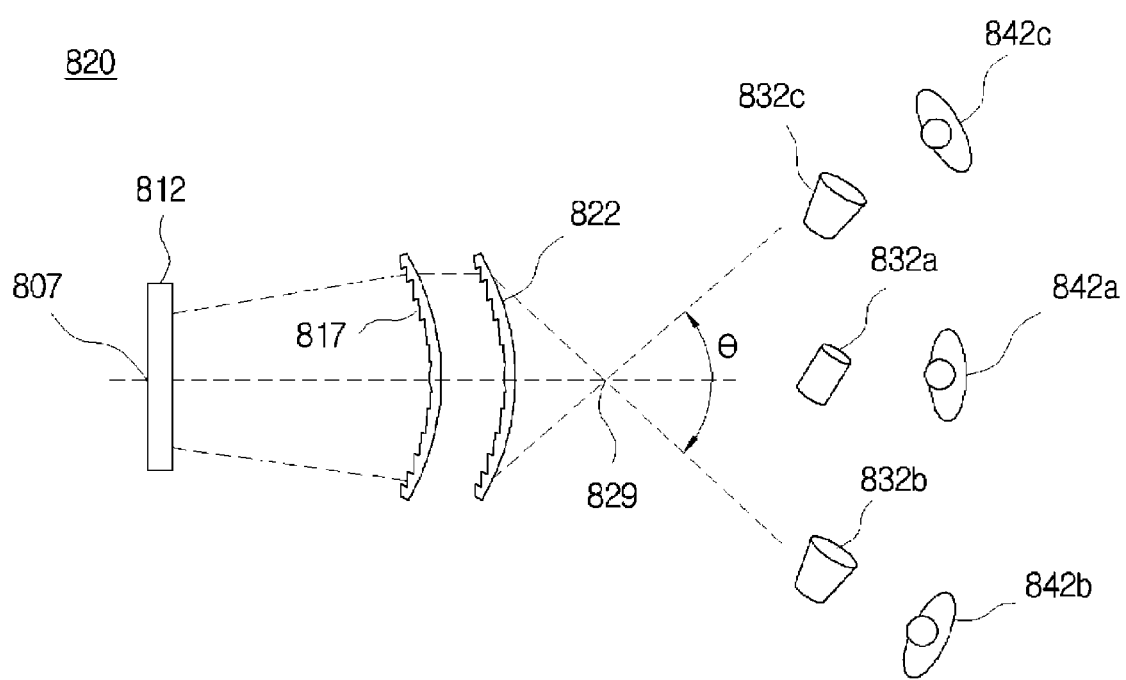

FIGS. 8A and 8B are a cross sectional view illustrating a 3-dimensional image device having wide viewing angles according to an embodiment of the invention. Hereinafter, the only difference may be explained.

Figure 9A:
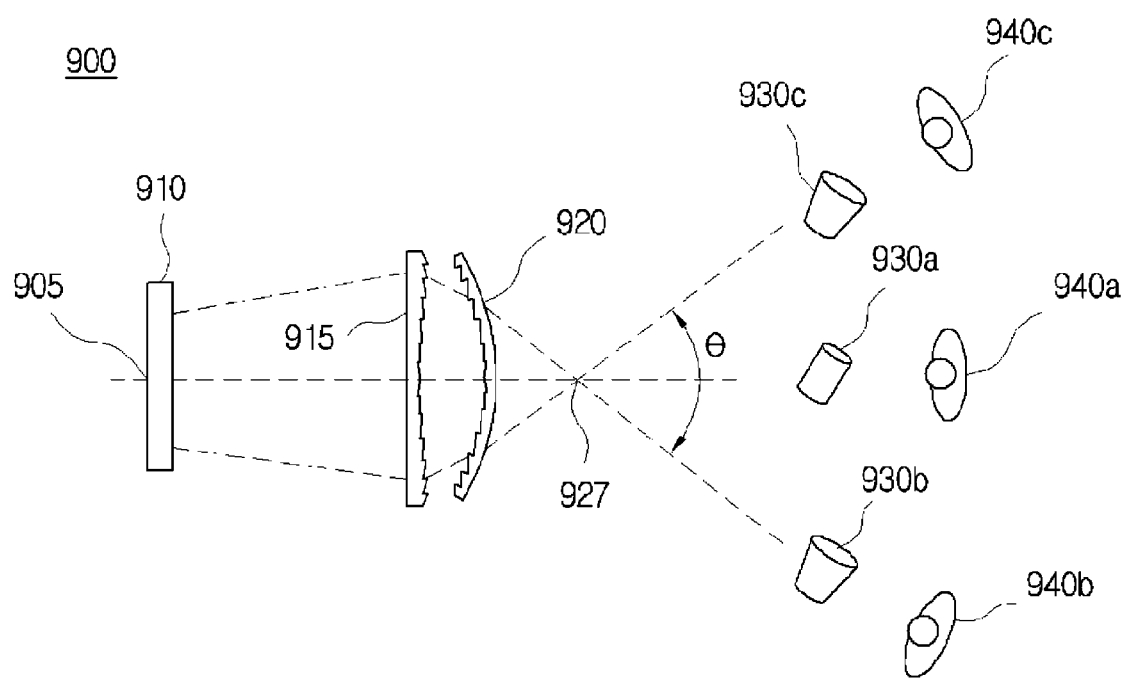
FIGS. 9A, 9B and 9C are a cross sectional view illustrating a 3-dimensional image device having wide viewing angles according to an embodiment of the present invention.
Figure 9B:
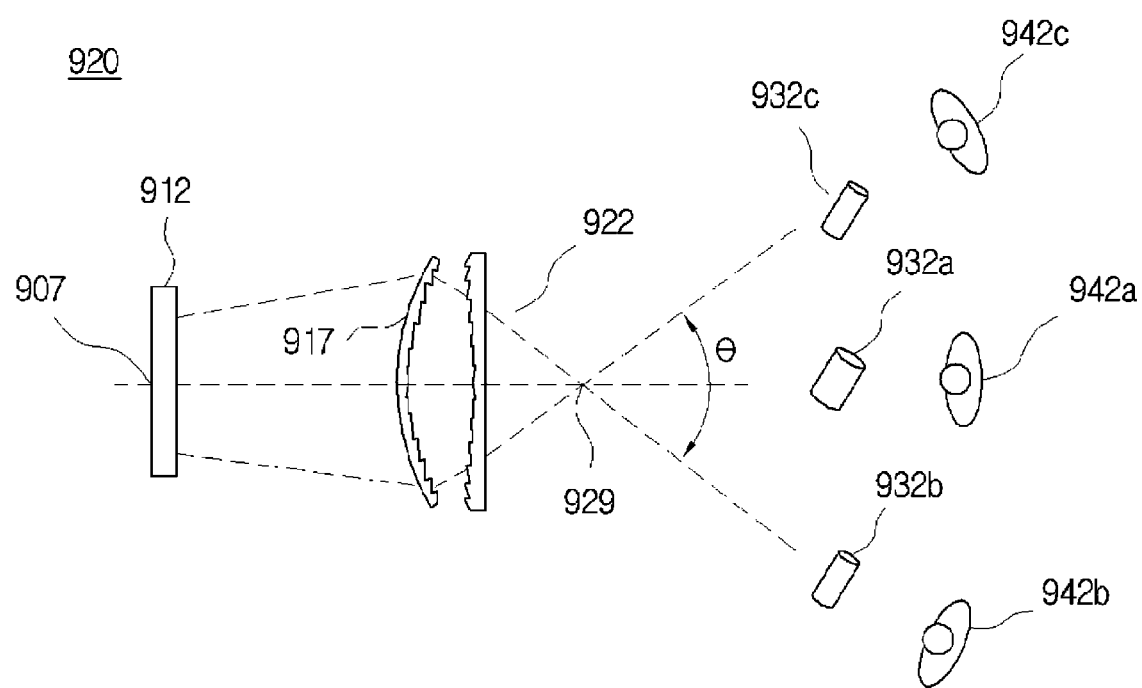
Figure 9C:
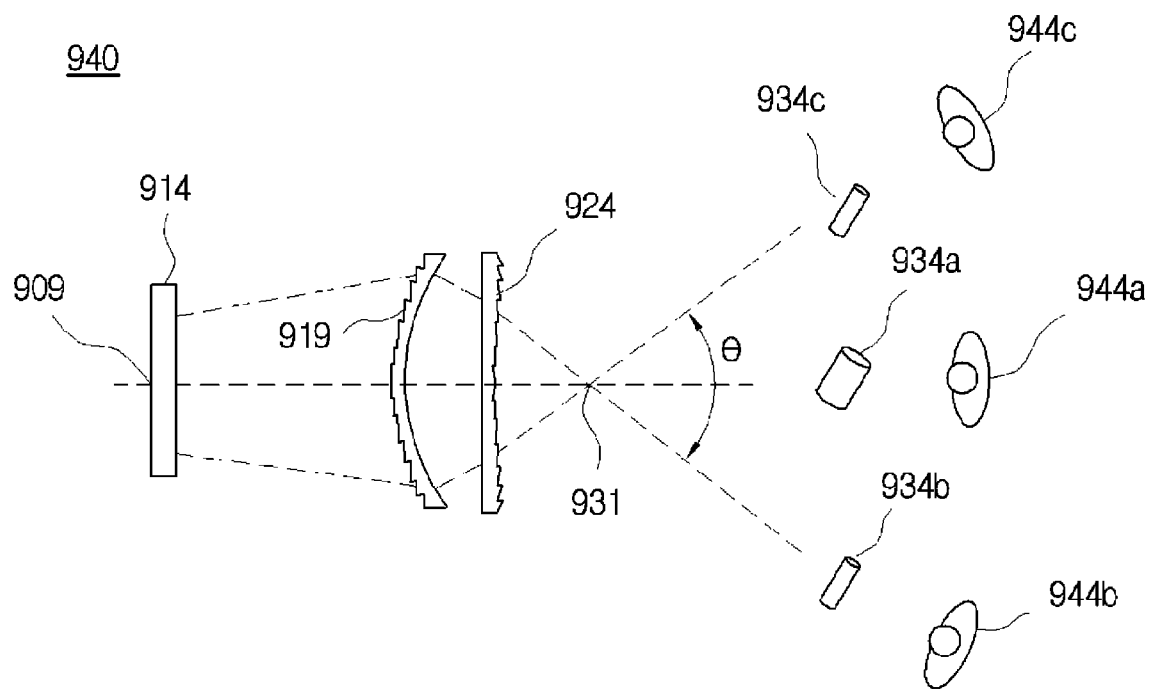

Referring to FIG. 8A, which illustrates two curved Fresnel lenses 815, 820 forming the double Fresnel lenses structure. The grooves of the two curved Fresnel lenses 815, 820 are arranged in opposite directions, respectively. A first curved Fresnel lens 815 can refract an input image in a broader way than a flat Fresnel lens. A second curved Fresnel lens 820 can refract the input image in a narrower way than the flat Fresnel lens, so that viewing angles can be reduced. 3-dimensional images 830a, 830b, 830c generated in accordance with an embodiment of the invention have no distortion at the critical angles of the left and right. By the composition of lenses referring to FIG. 8A, however, viewers 840a, 840b, 840c can observe 3-dimensional images having an equal sense of depth within the viewing angles of 20~30 degrees. This is because of rays of light gathering at the center portion through the curved surface of the second lens. Multiple curved Fresnel lenses 815, 820 can be arranged on the same central axis. Referring to FIG. 8B, the direction of grooves of the curved Fresnel lenses 817, 822 can be arranged in the same direction. Multiple curved Fresnel lenses 817, 822 can be arranged on the same central axis. The generated 3-dimensional images 832a, 832b, 832c may have distortion at the critical angles of the left and right, and the effect of distortion may act as a curved Fresnel lens so that narrow viewing angles of 20~30 degrees can be formed. Therefore, viewers 842a, 842b, 842c can observe 3-dimensional images 832a, 832b, 832c having an equal sense of depth within the narrow viewing angles of 20~30 degrees. FIGS. 9A, 9B and 9C are a cross sectional view illustrating a 3-dimensional image device having wide viewing angles according to an embodiment of the invention. Hereinafter, the only difference may be explained.

Referring to FIGS. 9A, an image source 910, a flat Fresnel lens 915 transmitting the image source, and a curved Fresnel lens 920 having wide viewing angles and a sense of depth for a transmitted image are provided.

In such cases, distortion of images can occur at the outer angles of the left and right even though the lens has wide viewing angels. In the composition, the flat Fresnel lens 915 is for refracting and converging an input image, and the curved Fresnel lens 920 is for expanding and refracting again. However, the refraction of input image frequently occurs at the flat Fresnel lens 915, the curved Fresnel lens 920 is for expanding the refracted image to the left and right, and 3-dimensional images 930b, 930c formed over the boundary surface appear with some portions expended among the top and bottom Referring to FIG. 9B, grooves of a curved Fresnel lens 917 are in the direction of a flat Fresnel lens 922. Such a composition may have wide viewing angles but may have a smaller 3-dimensional image at the critical angels of the left and right. Referring to FIG. 9C, the direction of grooves of a curved Fresnel lens 919 are arranged towards a image source 914, and the direction of a flat Fresnel lens 924 are arranged towards viewers 944ca, 944b, 944c. Although such a composition may have wide viewing angles and no distortion at the critical angels of the left and right, the composition may also have difficulty to obtain a 3-dimensional image of a large display due to circular bubbles forming at the center.

A 3-dimensional image display device, as referred to FIGS. 8A, 8B, 9A, 9B and 9C, in accordance with the present embodiment of the invention, can render a 3-dimensional image at a suitable portion or a limited space even though the device forms narrow viewing angles at some portions.

Figure 10:
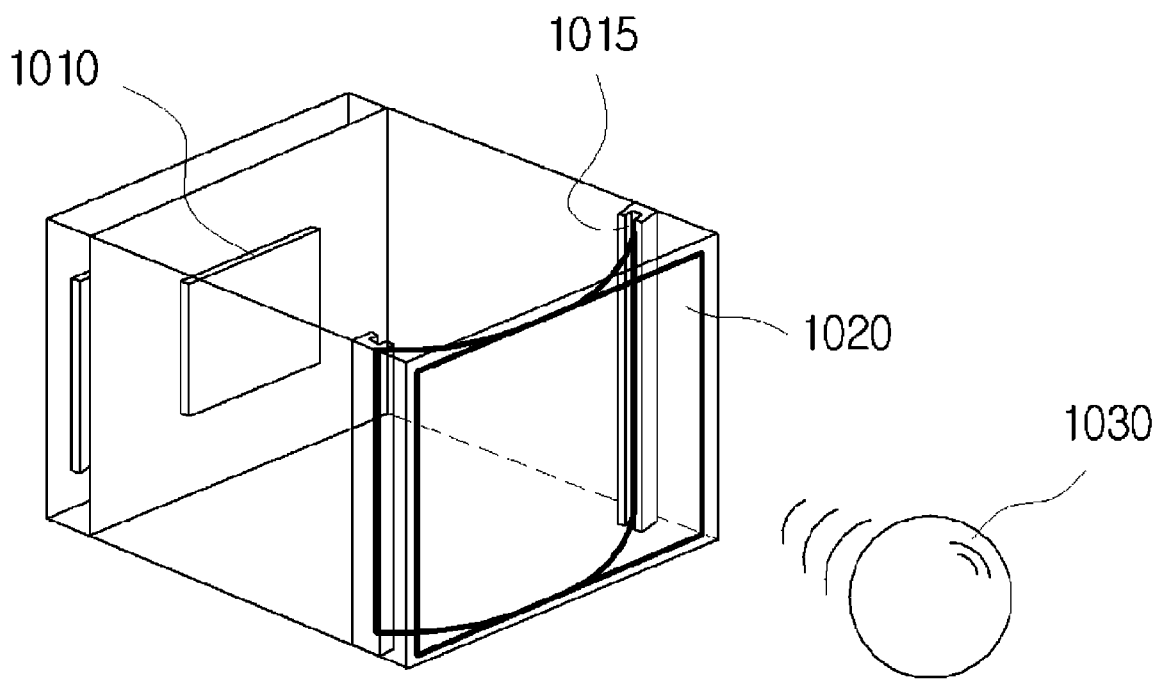
FIG. 10 is a perspective view illustrating the embodiment realizing a 3-dimensional image device having wide viewing angles as illustrated in FIG. 7 according to the present invention.

FIG. 10 is a perspective view illustrating the embodiment realizing a 3-dimensional image device having wide viewing angles as illustrated in FIG. 7 according to the invention. Referring to FIG. 10, there are illustrated a image source 1010, which includes a image transaction device for providing an input image, a curved Fresnel lens 1015, which provides a 3-dimensional image 1030 of a large display while having wide viewing angles and an equal sense of depth at the center as well as the critical angels of the left and right, and a flat Fresnel lens 1020, which generates the 3-dimensional image 1030. The distance from the image source 1010 to the curved Fresnel lens 1015 can be varied depending on the size and depth feelings of the 3-dimensional image 1030. Also, the distance from the curved Fresnel lens 1015 to the flat Fresnel lens 1020 may a distance, which has no size and no chromatic aberration of the 3-dimensional image 1030.

In explanation of embodiments embodied in real, a Fresnel lens was comprised of each one of M9700 and M9550, which are the product names of 3M Company. M9700 has a focal length of 350 mm, and M9550 has a focal length of 370 mm Likewise, the two Fresnel lenses have a different focal length, the Fresnel lens having a longer focal length among them can be placed against an input image, and certain curvature with curved type can be formed. Also, the focal length of the double Fresnel lenses comprising the curved Fresnel lens 1015 and the flat Fresnel lens 1020 is about 185 mm Here, a radius of curvature is about 120 mm The distance from the input image to the curved Fresnel lens 1020 is about 30 cm, and the distance between the curved Fresnel lens 1015 and the flat Fresnel lens 1020 must be maintained as 1~2cm. Here, a 2-dimensional image can be converted to a 3-dimensional image formed in the air over a place, which is about 30~40 cm distant from the flat Fresnel lens 1020 to a viewer. Here, the viewer can observe the 3-dimensional image from wide viewing angles of 90~100 degrees as well as from the critical angles without distortion. Also, wide viewing angles over 90 degrees can be provided by using a wide-type Fresnel lens at the ratio of 16:9 for forming wider viewing angles.

Figure 11:
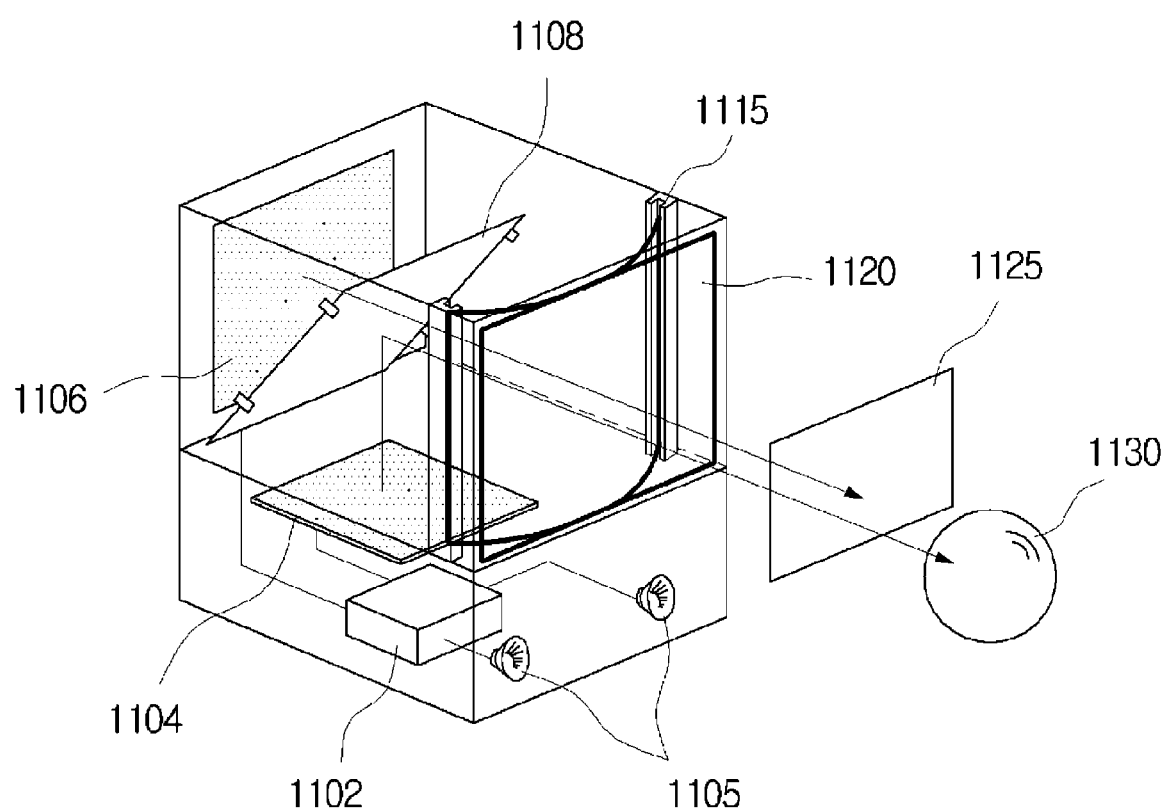
FIG. 11 is a perspective view illustrating the embodiment realizing a 3-dimensional image device having wide viewing angles as illustrated in FIG. 8 according to the present invention.

FIG. 11 is a perspective view illustrating the embodiment realizing a 3-dimensional image device having wide viewing angles as illustrated in FIG. 8 according to the invention. Hereinafter, the only difference may be explained.

Referring to FIG. 11, there are provided a control device 1102 for providing a image, a speaker part 1105, a first image source 1104 for providing a 3-dimensional image, a second image source 1106 for providing a background image 1125, a half mirror 1108 having transmissivity at the ratio of 50:50, which removes light from both image sources, for generating the background image 1125 by the second image source 1106 simultaneously with generating the 3-dimensional image by the first image source 1104, a curved Fresnel lens 1115 for providing the 3-dimensional image of a large display having a same sense of depth at the center as well as the critical angles and wide viewing angles, and a flat Fresnel lens 1120 for generating the 3-dimensional image 1130. While the first input image generated from the first image source 1104 is reflected by the half mirror 1108 and is projected towards the curved Fresnel lens 1115, the second input image generated from the second image source 1106, which is placed behind the half mirror 1108, is projected towards the curved Fresnel lens 1115 through the half mirror 1108.

Figure 12:
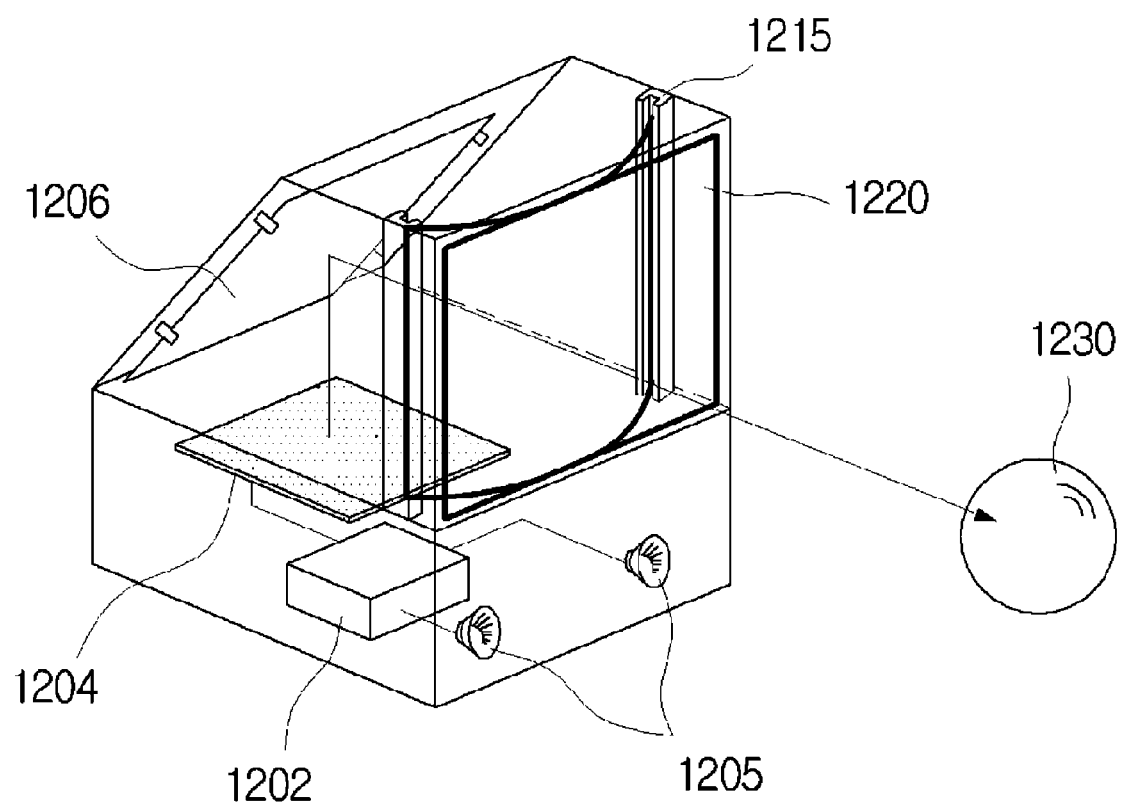
FIG. 12 is a perspective view illustrating the embodiment realizing a 3-dimensional image device having wide viewing angles as illustrated in FIG. 9 according to the present invention.

Here, the distance from the curved Fresnel lens 1115 to the first image source 1104 is longer than the distance from the curved Fresnel lens 1115 to the second image source 1106. The background image 1125 and the 3-dimensional image 1130 can be generated in accordance with the distances between each image source and the curved Fresnel lens 1115; in accordance with the distances between the place where each image source is and the curved Fresnel lens 1115. FIG. 12 is a perspective view illustrating the embodiment realizing a 3-dimensional image device having wide viewing angles as illustrated in FIG. 9 according to the present invention. Hereinafter, the only difference may be explained.

Figure 13:
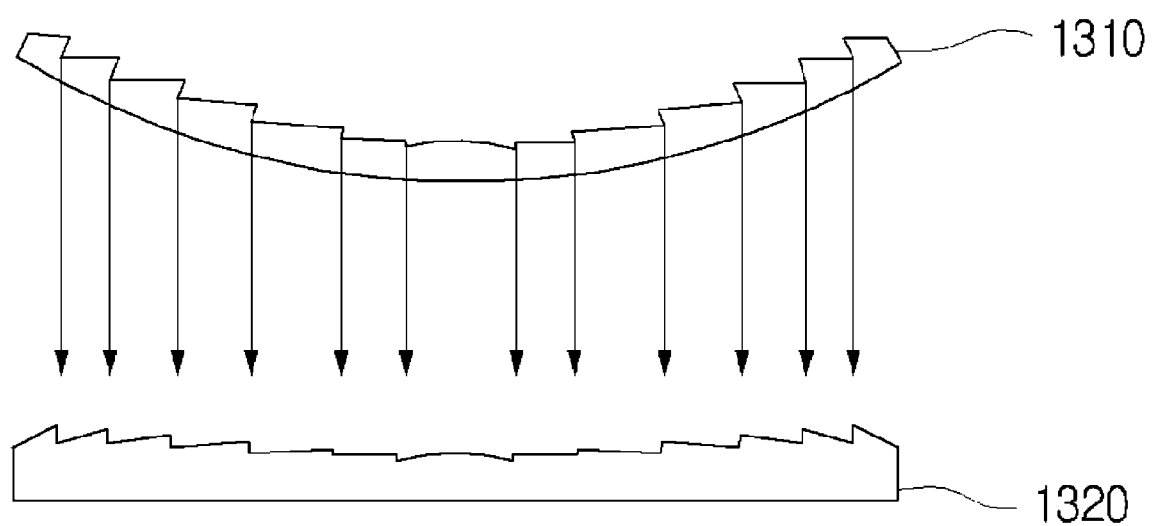
FIG. 13 is a cross sectional view illustrating a Fresnel lens used in a 3-dimensional image device having wide viewing angles according to an embodiment of the present invention.

Referring to FIG. 12, a combination for embodying a device of the present invention to a compact-type device having a small volume of space is provided. A control device 1202 for providing a image, a image source 1204, a reflect part (an optical mirror) 1206, a curved Fresnel lens 1215, and a flat Fresnel lens 1220 are provided. Since the image source 1204 and the curved Fresnel lens 1215 are almost arranged at right angles, a vertical or horizontal length can be adjusted in consideration of the length and volume of a place where the device in the invention is placed. The 3-dimensional image is generated in accordance with the distance from the image source to the curved Fresnel lens 1215 and to the flat Fresnel lens 1230. Likewise, a 3-dimensional image display device having a narrow width of space as a whole by minimizing the distance between the structures of the input image and the double Fresnel lenses using a half mirror only. FIG. 13 is a cross sectional view illustrating a Fresnel lens used in a 3-dimensional image device having wide viewing angles according to an embodiment of the invention.

Referring to FIG. 13, the Fresnel lens in accordance with an embodiment of the invention are composed of a curved Fresnel lens 1310 and a flat Fresnel lens 1320 formed with grooves on one side thereof. That is, the Fresnel lens 1320 having grooves on its both sides may have a curved Fresnel lens surface on its one side and a flat Fresnel lens on the other side. Here, the focal lengths of the curved Fresnel lens and the flat Fresnel lens can be different to each other. The focal length and the type of grooves can be formed corresponding to those of the curved Fresnel lens and flat Fresnel lens specially provided in various embodiments of the invention.

Figure 14:
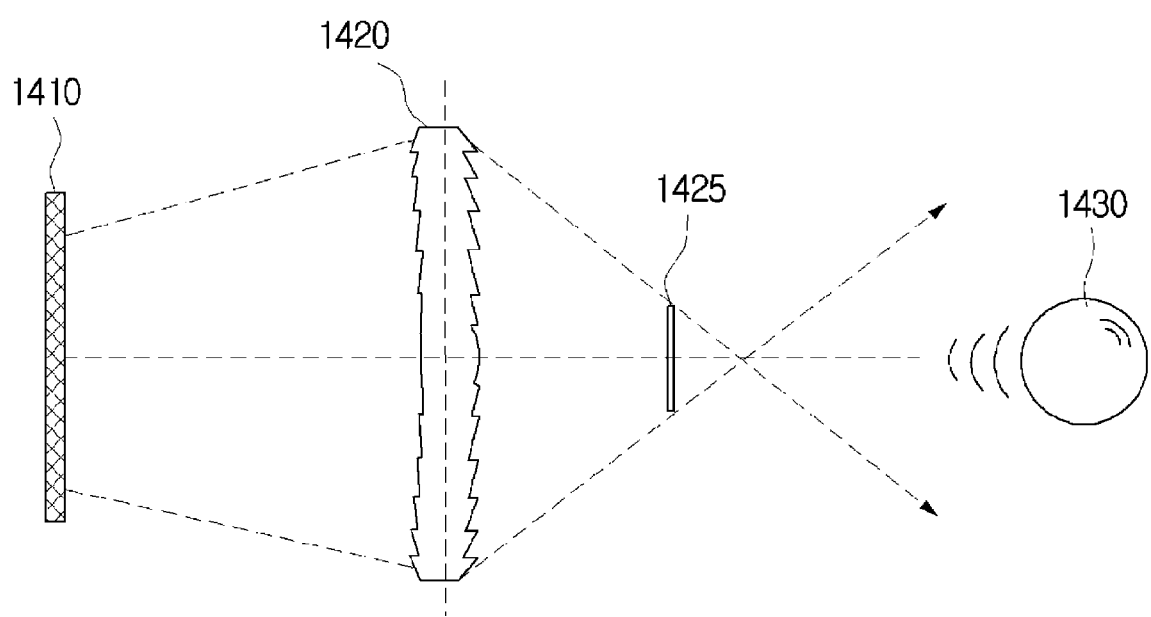
FIG. 14 is a cross sectional view illustrating a 3-dimensional image device having wide viewing angles according to an embodiment of the present invention.

The arrangement of lenses embodied in that way can simplify and maximize the use of space and apply to a 3-dimensional image display device which has the same effect to the invention. FIG. 14 is a cross sectional view illustrating a 3-dimensional image device having wide viewing angles according to an embodiment of the invention. Hereinafter, the only difference may be explained.

Referring to FIG. 14, a double-faced Fresnel lens 1420, which has the grooves of a curved Fresnel lens and the groove of a flat Fresnel lens formed on its both sides respectively, is provided. That is, for the simple structure of the curved Fresnel lens and flat Fresnel lens according to an embodiment of the invention, the double-faced Fresnel lens 1420 of the single complex structure which forms the properties of the two lenses on a double-faced lens is provided. An input image generated from an image source 1410 generates a 3-dimensional image 1430 having wide viewing angles through an output image focal plane 1425 transmitting the both-faced Fresnel lens 1420. By such a combination, the method of manufacturing the 3-dimensional image display device can be simple and much easy and has an advantage in space saving and manufacturing costs due to the use of a lens in massive production.

Figure 15A:
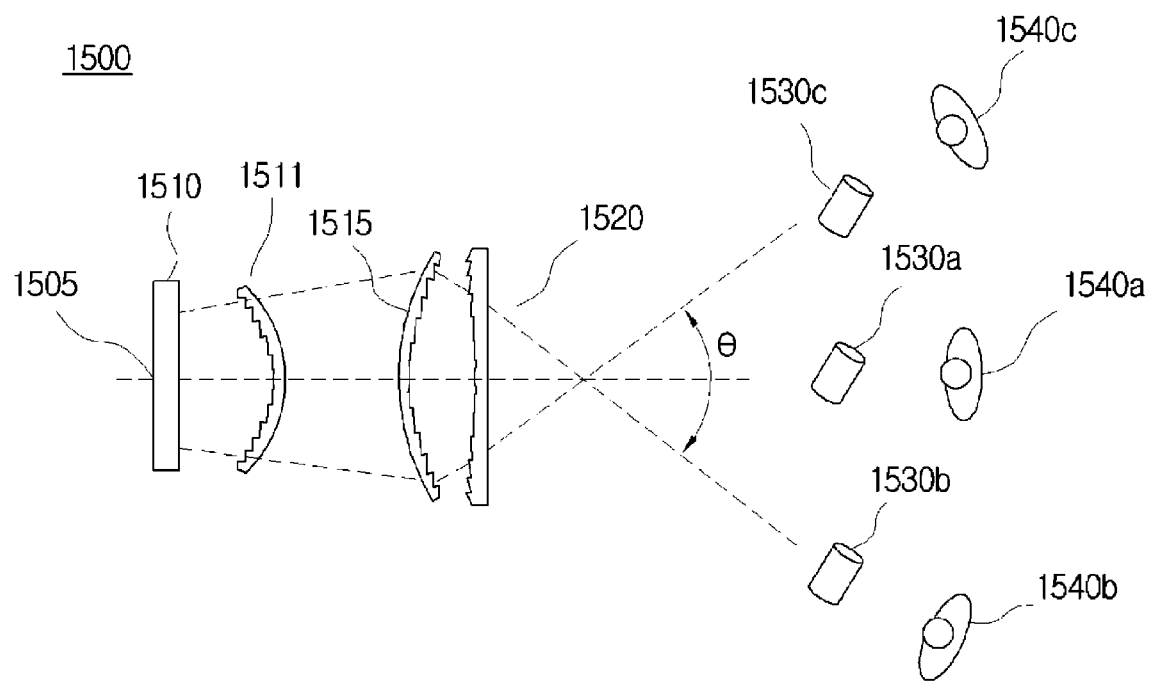
FIGS. 15A and 15B are a cross sectional view illustrating a 3-dimensional image device having wide viewing angles according to an embodiment of the present invention.
Figure 15B:
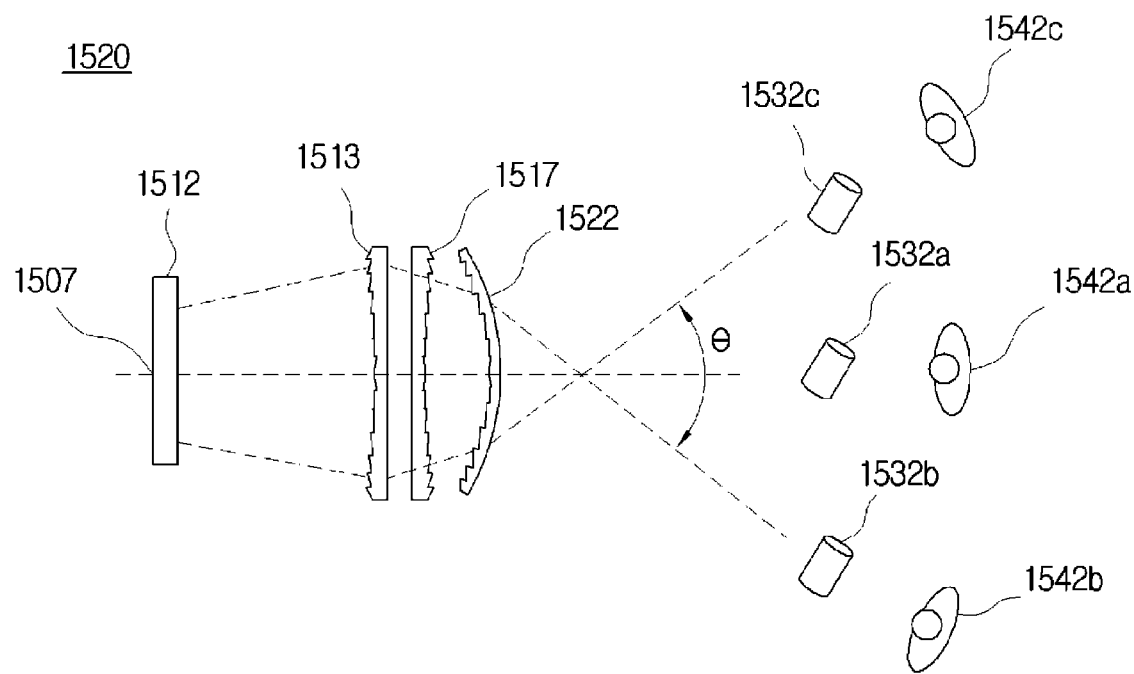

FIGS. 15A and 15B are a cross sectional view illustrating a 3-dimensional image device having wide viewing angles according to an embodiment of the invention. Hereinafter, the only differences may be explained.

Referring to FIG. 15A, a 3-dimensional image display device 1500 having wide viewing angles according to an embodiment of the invention may include: an image source 1510; a first curved Fresnel lens 1511, in which grooves are towards the image source 1510; a second curved Fresnel lens, in which grooves are towards a image projected outwards; and a flat Fresnel lens 1520. The position of the first curved Fresnel lens 1511 is characterized in extending an input image to wide angles by shortening its focal length than the distance between the image source 1510 and the first curved Fresnel lens 1511. A second curved Fresnel lens 1515 is for gathering the image transmitted and extended from the first curved Fresnel lens 1511 into the boundary of a flat Fresnel lens 1520. Here, the first curved Fresnel lens 1511, the second curved Fresnel lens 1515 and the flat Fresnel lens 1520 are arranged on the same central axis.

In this way, the refracted input image can generate 3-dimensional images 1530*a*, 1530*b*, 1530*c* having wide viewing angles and the same sense of depth through the flat Fresnel lens 1520. Consequently, viewers 1540*a*, 1540*b*, 1540*c* can observe the 3-dimensional images 1530*a*, 1530*b*, 1530*c* having wide viewing angles and the same sense of depth within the range of the wide viewing angles. Such a composition provides a 3-dimensional image display device having wide viewing angles according to an embodiment of the invention using Fresnel lenses having a different focal length or having the different properties of refraction or the size of a lens.

Referring to FIG. 15B, a 3-dimensional image display device 1520 having wide viewing angles according to an embodiment of the invention may include: an image source 1507; a first flat Fresnel lens 1513, in which grooves are towards the image source 1507; a second flat Fresnel lens 1517, in which grooves are towards a image projected outwards; and a curved Fresnel lens 1522. Here, the first flat Fresnel lens 1513, the second flat Fresnel lens 1517 and the curved Fresnel lens 1522 are arranged on the same central axis.

This combination can embody a 3-dimensional image, which is formed in a spherical shape and formed by two flat Fresnel lenses in prior art, into 3-dimensional images 1532*a*, 1532*b*, 1532*c*, which have less distortion by extending and refracting the 3-dimensional image from the curved Fresnel lens 1522 at the outermost.

The image source mentioned here can be used as a wide-type input image at the ratio of 16:9 according to an embodiment of the inventions, and used as a display of among CRT, LCD, PDP, LED, OLED, projectors, 3-dimensional image monitors with glasses or without glasses and etc. Also, the image source can be a real product. Also, a 3-dimensional image effect can be maximized by adding supplement devices such as interactive image cameras, various sensors of wireless RF type or etc. In order to increase the 3-dimensional image effect, a 3-dimensional image sound system can be composed and manufactured, and the sounds for the input image through speakers can be provided as well.

The 3-dimensional image display device according to an embodiment of the invention can be applied in 3-dimensional TVs, navigators for a car, advertisements and exhibition halls for indoors and outdoors, event halls, theme parks, medical images, games and etc. Also, the device can be loaded on conventional devices as various types of unmanned terminals and automated devices, etc. Furthermore, a more interactive 3-dimensional image can be provided through combination of various sensor technologies.

While the spirit of the invention has been described in detail with reference to particular embodiments, the embodiments are for illustrative purposes only and do not limit the invention. It is to be appreciated that those skilled in the art can change or modify the embodiments without departing from the scope and spirit of the invention.

INDUSTRIAL APPLICABILITY

According to an embodiment of the invention, a 3-dimensional image display device can be applied in 3-dimensional TVs, navigators for a car, advertisements and exhibition halls for indoors and outdoors, event halls, theme parks, medical images, games and etc.

The invention claimed is:

1. A 3-dimensional image display device having wide viewing angles, comprising:
    an image source for supplying an image;
    a first Fresnel lens configured to refract and transmit the image being incident from the image source; and
    a second Fresnel lens configured to generate a 3-dimensional image by refracting and transmitting the image transmitted by the first Fresnel lens,
    wherein at least one of the first Fresnel lens and the second Fresnel lens is a curved Fresnel lens, wherein a focal length of the first Fresnel lens is greater than a focal length of the second Fresnel lens.

2. The 3-dimensional image display device of claim 1, wherein the first Fresnel lens is a curved Fresnel lens and grooves of the curved Fresnel lens are formed in a direction facing the image source, and the second Fresnel lens is a flat Fresnel lens and grooves of the flat Fresnel lens are formed in a direction facing opposite the image source.

3. A 3-dimensional image display device having wide viewing angles, comprising:
    an image source for supplying an image;
    a first Fresnel lens configured to refract and transmit the image being incident from the image source; and
    a second Fresnel lens configured to generate a 3-dimensional image by refracting and transmitting the image transmitted by the first Fresnel lens,
    wherein at least one of the first Fresnel lens and the second Fresnel lens is a curved Fresnel lens, wherein the focal length of the first Fresnel lens is smaller than the focal length of the second Fresnel lens.

4. The 3-dimensional image display device of claim 1 or claim 3, further comprising a third Fresnel lens interposed between the first Fresnel lens and the second Fresnel lens and refracting and transmitting an image transmitted through the first Fresnel lens, wherein the first Fresnel lens and the third Fresnel lens are curved Fresnel lenses curved in opposite directions, and grooves of the first Fresnel lens are formed in a direction of facing the image source, and grooves of the third Fresnel lens are formed in a direction of facing the second Fresnel lens, and the second Fresnel lens is a flat Fresnel lens.

5. The 3-dimensional image display device of claim 1 or claim 3, further comprising a third Fresnel lens interposed between the first Fresnel lens and the second Fresnel lens and refracting and transmitting an image transmitting through the first Fresnel lens, wherein the first Fresnel lens and the third Fresnel lens are flat Fresnel lenses, and grooves of the first Fresnel lens and grooves of the third Fresnel lens are formed in a direction of facing each other or in opposite directions, and the second Fresnel lens is a curved Fresnel lens.

6. The 3-dimensional image display device of claims 1 or claim 3, wherein any one of anti-glare, an AR polarized film and a surface antireflection mask is coated over a surface of the first Fresnel lens or the second Fresnel lens.

7. The 3-dimensional image display device of claim 1 or claim 3, wherein the image source comprises:
   a main image source for providing a main image; and
   a background image source for providing a background image as a background of the main image.

8. The 3-dimensional image display device of claim 7, wherein the image source further comprises a translucent minor configured to reflect the main image and transmit the background image.

9. The 3-dimensional image display device of claim 7, wherein the image source is a real object or a display of any one selected from the group consisting of CRT, LCD, PDP, LED, OLED, DLP projectors and flexible displays.

10. A Fresnel lens having grooves formed on both sides thereof, comprising:
    a curved type Fresnel lens surface configured to refract and transmit incident light; and
    a flat type Fresnel lens surface configured to refract and transmit light transmitted through the curved type Fresnel lens surface and have a smaller focal length than the curved type Fresnel lens surface.

11. A 3-dimensional image display device having wide viewing angle, comprising:
    an image source for providing an image; and
        a Fresnel lens, a curved type Fresnel lens surface and a flat type Fresnel lens surface formed respectively on either side of the Fresnel lens, the curved type Fresnel lens surface refracting and transmitting incident light, the flat type Fresnel lens surface refracting and transmitting light transmitted through the curved type Fresnel lens surface and having a smaller focal length than the curved type Fresnel lens surface.

12. The 3-dimensional image display device of claim 11, wherein the image source comprises:
    a main image source for providing a main image; and
    a background image source for providing a background image as a background of the main image.

13. The 3-dimensional image display device of claim 11 or claim 12, wherein the image source further comprises a translucent mirror configured to reflect the main image and transmit the background image.

14. The 3-dimensional image display device of claim 11, wherein the image source is a real object or a display of any one selected from the group consisting of CRT, LCD, PDP, LED, OLED, DLP projectors and flexible displays.

15. The 3-dimensional image display device of claim 11, wherein any one of anti-glare, an AR polarized film and a surface antireflection mask is coated over a surface of the flat type Fresnel lens surface.

\* \* \* \* \*